United States Patent [19]
Chapman

[11] 3,763,022
[45] Oct. 2, 1973

[54] CONDENSING FRACTIONATOR SIDESTREAM VAPOR AS REBOILER HEAT SOURCE

[75] Inventor: Charles C. Chapman, Bartlesville, Okla.

[73] Assignee: Phillips Petroleum Company, Bartlesville, Okla.

[22] Filed: July 9, 1971

[21] Appl. No.: 161,108

[52] U.S. Cl............... 203/25, 203/71, 260/683.4, 260/683.48
[51] Int. Cl........................ B01d 3/00, C07c 3/50
[58] Field of Search .............. 203/25, 71, 26, 52, 203/68, 70; 202/185 D, 174; 260/683.43, 683.58, 683.59, 683.48; 676 R

[56] References Cited
UNITED STATES PATENTS
3,340,158 9/1967 Bates ............................ 203/25
3,502,547 3/1970 Bridgeford ...................... 203/71
3,324,010 6/1967 Bauer et al. ..................... 203/25

Primary Examiner—Norman Yudkoff
Assistant Examiner—David Edward
Attorney—J. Arthur Young et al.

[57] ABSTRACT

A stream of vapor is continuously withdrawn from a fractionator column and passed directly to a heat exchange means in contact with the liquid in a second fractionator column. Heat is imparted to raise the temperature of the liquid in the fractionator and to condense the vapor stream withdrawn from the first fractionator. In a preferred embodiment isobutane vapor is withdrawn in a sidestream from an alkylation product fractionator and is condensed by imparting heat to the liquid in a fractionator which separates isobutane feed stock from a butane mixture wherein a controlled amount of additional heat is supplied to raise the temperature of the second fractionator sufficiently to effect separation of the mixed butane feed.

4 Claims, 1 Drawing Figure

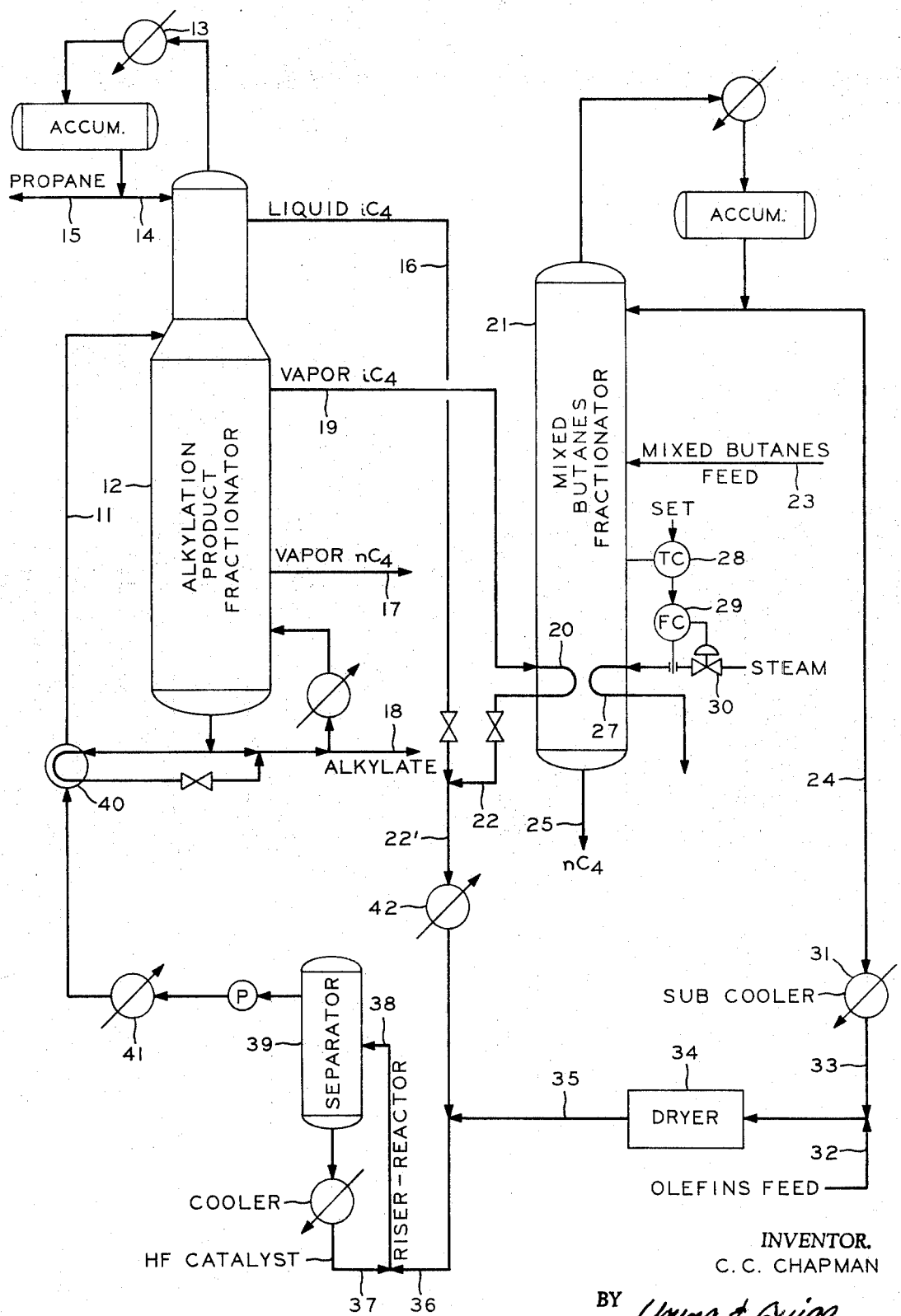

CONDENSING FRACTIONATOR SIDESTREAM VAPOR AS REBOILER HEAT SOURCE

BACKGROUND OF THE INVENTION

This invention relates to the exchange of heat in a chemical process system. In one of its aspects, it relates to a method for conserving the heat produced in a chemical process. In another of its aspects, it relates to a method for supplying heat to a fractionator column. In still another of its aspects, it relates to a method for supplying a controlled amount of heat to a fractionator column.

In one concept of the invention it provides a method for supplying heat to a fractionator column from the heat used to produce a product stream from another fractionator column. In another of its concepts, it provides a method for conserving the heat within a chemical process system by using the heat taken from a stream being condensed to supply heat to a stream being vaporized.

In a catalytic alkylation process the chemical operation generally consists of intimately mixing a mixture of hydrocarbons containing isoparaffins such as isobutane, isopentane and the like, and olefins such as propylene, butene-1, cis- and trans-butene-2, isobutene and the like in the presence of a strong acid catalyst such as hydrofluoric acid at a temperature and for a time sufficient to complete the reaction. The alkylate product contains saturated isoparaffins of higher molecular weight and higher boiling point than the isoparaffins in the original feed mixture. Because of its reactivity and availability, isobutane has been the favorite isoparaffin in alkylation reactions. Among the olefins propylenes and butenes have been the most used in these reactions.

In the reaction product mixture of an alkylation reaction between isobutane and olefin, for example, there is usally an excess of the isoparaffin hydrocarbon remaining in the effluent along with propane and normal butane. It is commercially desirable to recover and reuse the isoparaffin reactant and to recover the propane for use, e.g., as a LPG fuel, and normal butane, e.g., as a motor fuel blend component.

A typical fractionator for an alkylation effluent introduces a hydrocarbon feed mixture containing propane, isobutane, n-butane and alkylate product into a fractionator column. A controlled amount of heat is supplied at the base of the column and a controlled amount of cooling is supplied at the top of the column. Manipulation of the fractionation conditions in the column will allow the alkylate stream to be removed from the bottom of the column, normal butane to be removed as a vapor in a lower sidestream, isobutane to be removed as a vapor in an upper sidestream (below the feed tray), an isobutane liquid stream to be removed above the feed tray (optional), and propane vapor to be removed from the top of the column. Generally the vapor streams are contacted with a coolant in a heat exchange operation to condense them for ease of handling as reflux, recycle to the process, or for storage. Because of the cooling systems to condense the vapor streams a heat loss results to the entire system.

Therefore, it is an object of this invention to provide a method for condensing a vapor stream from an alkylate product fractionator whereby the heat from the condensing vapor stream is put to use. It is another object of this invention to provide a method of imparting heat to the liquid in a fractionator column using a vapor stream from another fractionator as source of heat. It is a further object of this invention to provide a method for controlling the temperature in a fractionator column when the supply of heat to the column comes from more than one source.

Other aspects, concepts and objects of the invention are apparent from a study of this disclosure, the drawing and the appended claims.

According to the present invention there is provided a method for condensing a vapor stream withdrawn from a fractionator column by which the vapor stream is passed directly and continuously into the heating coil of a second fractionator column so that the exchange of heat between the stream of vapor and the liquid in the second fractionator column condenses the vapor stream to a liquid.

In another embodiment of the invention the exchange of heat between the vapor stream and the liquid in the second fractionator is a source of heat for raising the temperature of the liquid in the second fractionator.

In another embodiment of the invention a method of controlling the temperature in a fractionator is provided so that when more than one source of heat is necessary to maintain a specified temperature a temperature sensing system controls the supply of additional heat.

Referring now to the drawing, alkylation reaction product, which for the purpose of this illustration will be taken as containing propane, isobutane, n-butane and alkylate product, is pumped through line 11 into the alkylation product fractionator 12. In the alkylation product fractionator the reaction product is separated into compounds of increasingly higher boiling points so that by control of the temperatures in the fractionator propane can be taken off overhead in the column through a condenser 13 to be returned to the column through line 14 as a refluxing agent or through line 15 the condensed material can be taken to storage. In the usual alkylation product fractionator a liquid isobutane stream is taken off the side of the column above the feed tray through line 16, a sidestream of normal butane vapor is taken off near the bottom of the column through line 17, and product alkylate is removed as kettle bottoms through line 18. Isobutane vapor is taken off as a sidestream from the product fractionator through line 19 below the feed tray and is directed through the kettle coil 20 of a mixed butane fractionator 21 where it is condensed by indirect heat exchange with the liquid in the fractionator, and is removed from the heat exchanger through line 22 as a liquid. Into the mixed butane fractionator a mixed butane feed is fed through line 23. This feed is separated into an isobutane taken overhead through line 24 and a normal butane stream taken as kettle liquid through line 25. In this system the heat obtained in the butane fractionator kettle by condensing the isobutane vapor from the product fractionator sidestream is not sufficient to maintain a temperature necessary to separate the isobutane and normal butane in the column feedstock. A secondary source of heat, in this case steam, is supplied through line 26 into a second kettle coil 27. The amount of steam allowed to flow through line 26 is controlled by a temperature controller 28 which controls the flow controller 29 which operates the motor valve 30 adjusting the flow of steam into the line 26. This steam is used to maintain the preselected reboil temperature in the mixed butane fractionation 21. If the heat from condensing isobutane vapor 19 in the indirect heat exchanger decreases or increases, the amount of steam added increases or decreases, proportionally to maintain the preselected reboil temperature.

The condensed liquid isobutane 22 is usually admixed with liquid isobutane 16 and passed via conduit 22' for indirect heat exchange with the feed to the alkylate product fractionator in exchanger 42. Overhead isobutane liquid make up 24 is subcooled in exchanger 31, and admixed with olefin feed 32. The admixture is dried in 34, e.g., a bauxite dryer, and passed through line 35. In line 36 the liquid from line 35 is admixed with the isobutane in 22' exiting from exchanger 42 and the resulting hydrocarbon admixture 36 is charged with cooled HF catalyst 37 to riser-reactor 38. The reaction product mixture from 38 is passed to separator 39 from which heavier HF catalyst phase is separated and recycled to the riser-reactor 38. The less dense hydrocarbon phase from separator 39 is heated by indirect heat exchange in exchanger 41 and exchanger 40, and charged via conduit 11 to the alkylation fractionator 12.

The catalytic alkylation process for which the process of this invention is suitable generally consists of a reaction of a mixture of hydrocarbons comprising isoparaffins containing from 4 to 8 carbon atoms and olefins containing 2 to 8 carbon atoms. The isoparaffins most commonly used as feedstock for motor gasoline alkylate are isobutane and isopentane. The olefins most commonly used are ethylene, propylene and butenes. The preferred feedstocks currently are isobutane and propylene-butylenes admixture, or isobutane and butylenes.

In the alkylation product fractionators of the prior art a heat exchanger is required on all vapor draw-offs from the column to condense the streams into more easily handled and stored liquid products. Using a vapor sidestream as the heat exchange medium to increase the temperature in another fractionator yields an initial saving or investment on equipment by eliminating an external heat exchanger and, in general, eliminates an operating cost for water or other cooling medium used to condense the vapor by the method of the prior art. The following example illustrates the practice of the present invention as represented by data taken from a commercial scale plant design. This example was chosen as illustrative of the process of the invention and is not to be taken as exclusive.

EXAMPLE I

Typical operating data for condensing an isobutane vapor stream to partially reboil the kettle liquid of a mixed butane fractionator using as a basis for the data 1,000 barrels of isobutane produced from the mixed butane fractionator is presented below. Parenthetical numbers refer to corresponding streams illustrated in the drawing accompanying this disclosure.

TABLE I

Mixed Butane Fractionator (21) Operating Conditions

| Liquid Feed (23) | Isobutane Make (24) | Temperature °F Top | Bottom | Pressure psig |
|---|---|---|---|---|
| 3,420 | 1,000 | 138 | 163 | 125 |

The table above shows the operating conditions with relative feed and product flows in a fractionator in which the vapor condensation source of heat of this invention can be used.

To produce 1,000 barrels of isobutane overhead from the fractionator requires 387,000 pounds of 150 psig steam used as heat source. By substituting isobutane vapor (19) at 227° F for the steam and producing 5,370 barrels of condensed isobutane (22) at 220° F by indirect heat exchange with the fractionator (21) kettle liquid the amount of 150 psig steam used to maintain a kettle liquid temperature of 163° F is reduced to 4,070 pounds per 1,000 barrels of isobutane produced. This is a substantial saving in steam cost. There is also a corresponding saving in the cost of coolant used to condense isobutane into an easily handled liquid.

Reasonable variation and modification are possible within the scope of the foregoing disclosure, the drawing and the appended claims to the invention the essence of which is that there has been provided a method for condensing a sidestream draw-off vapor from a fractionator column which utilizes the heat of the vapor to increase the temperature of the kettle liquid of a second fractionator.

I claim:

1. A method for preparing isobutane containing feedstock for alkylation utilizing heat exchange from a recycle fractionation stream, said method comprising:
   a. passing a first stream comprising isobutane and normal butane into a first fractionation zone;
   b. recovering a first liquid isobutane-containing stream from said first fractionation zone;
   c. subcooling said first liquid isobutane-containing stream to produce a subcooled liquid isobutane-containing stream;
   d. admixing said subcooled liquid isobutane-containing stream with a second liquid isobutane-containing stream obtained hereinafter and passing the admixture to an alkylation zone;
   e. passing alkylation product as a second stream comprising propane, isobutane, normal butane, and alkylate into a second fractionation zone;
   f. recovering a third liquid isobutane-containing stream from said second fractionation zone;
   g. recovering from said second fractionation a vaporous isobutane-containing stream from a locus below said third liquid isobutane-containing stream;
   h. indirectly heat exchanging said vaporous isobutane-containing stream in a kettle zone of said first fractionation zone to produce a fourth liquid isobutane-containing stream; and
   i. combining said third liquid isobutane-containing stream and said fourth liquid isobutane-containing stream to produce said second liquid isobutane-containing stream.

2. A method of claim 1 wherein normal butane is recovered from both said first and said second fractionation zones and wherein alkylate product is recovered from said second fractionation zone.

3. A method of claim 1 wherein the indirect heat exchange of said vaporous isobutane-containing stream in the kettle zone of said first fractionation zone to produce a fourth liquid isobutane-containing stream raises the temperature of said first fractionation zone to maintain a preselected temperature in said first fractionation zone.

4. A method of claim 3 wherein additional heat for said first fractionation zone is obtained from a secondary source, the flow of said additional heat supply being controlled by a temperature sensing system in the first fractionation zone to maintain a preselected temperature.

* * * * *